Patented Oct. 17, 1950

2,526,605

UNITED STATES PATENT OFFICE 2,526,605

GASKET MATERIAL

George L. Fraser, Springfield, Mass., assignor to Monsanto Chemical Company, St. Louis, Mo., a corporation of Delaware No Drawing. Application December 4, 1948,
Serial No. 63,625

4 Claims. (Cl. 117—140)

This invention relates to improved gasket materials. More particularly, this invention relates to gasket materials made by impregnating cellulosic sheets with polymerizable materials.

Many characteristics are sought in preparing gasket material. For example, such materials should be resilient, as well as solvent-resistant. In addition, it is necessary that the preparation thereof be economical.

It is an object of this invention to provde an improved gasket material. A particular object of this invention is to provide an inexpensive gasket material having a high degree of resiliency, coupled wth a high degree of solvent resistance.

These and other objects are accomplished by impregnating porous cellulosic sheets with a mixture of diallyl phthalate and an unsaturated polyester resin made by reacting a mixture of maleic acid, phthalic acid and semi-drying oil acids with a glycol having 2–4 carbon atoms.

The following examples are illustrative of the present invention, but are not to be construed as limitative thereof. Where parts are mentioned, they are parts by weight

Example I

| | Parts |
|---|---|
| Maleic anhydride | 16 |
| Phthalic anhydride | 32 |
| Ethylene glycol | 28 |
| Soybean oil fatty acids | 24 |

The foregoing ingredients are placed in a suitable vessel provided with an air-cooled condenser and heated up to about 215° C. while agitating the mixture and passing a stream of carbon dioxide through the mass. Reaction under these conditions is continued until the acid value of the mixture drops to 53. 100 parts of the resulting product are then admixed with the following:

| | Parts |
|---|---|
| Diallyl phthalate | 50 |
| Ditertiary butyl catechol | 0.01 |
| Cobalt naphthenate solution in mineral spirits (6% cobalt) | 0.01 |
| Manganese naphthenate solution in mineral spirits (6% manganese) | 0.01 |
| Benzoyl peroxide | 1.5 |

Uncalendered sheets of alpha-cellulose, approximately 0.015 inch in thickness, are impregnated with the above mixture. The impregnated sheets in which the resin pick-up is about 100% are then heated for 30 minutes at 100° C. to cure the resin. The resulting product is found to be thoroughly cured throughout to a non-tacky gasket material having an exceptional degree of resiliency, as well as resistance to organic solvents and freedom from porosity.

Example II

Example I is repeated except that the components are used in the following proportions:

| | Parts |
|---|---|
| Maleic anhydride | 600 |
| Phthalic anhydride | 1200 |
| Ethylene glycol | 1200 |
| Soybean oil fatty acids | 1000 |

The polyester made from the above ingredients in the manner set forth in Example I is mixed with:

| | Parts |
|---|---|
| Diallyl phthalate | 1000 |
| Para-tertiary butyl catechol | 0.6 |
| Cobalt naphthenate solution in mineral spirits (6% cobalt) | 1.0 |
| Manganese naphthenate solution in mineral spirits (6% manganese) | 1.0 |

Gasket material using the above composition as the impregnating material possesses generally the same outstanding characteristics as the product of Example I although it is somewhat softer and more resilient.

Example III

Example I is repeated except that the components are used in the following proportions:

| | Parts |
|---|---|
| Maleic anhydride | 65 |
| Phthalic anhydride | 100 |
| Ethylene glycol | 95 |
| Soybean oil fatty acids | 75 |

The polyester made from the above ingredients by the method of Example I is mixed with:

| | Parts |
|---|---|
| Diallyl phthalate | 80 |
| Para-tertiary butyl catechol | 0.033 |
| Cobalt naphthenate solution in mineral spirits (6% cobalt) | 0.066 |
| Manganese naphthenate solution in mineral spirits (6% manganese) | 0.066 |

Gasket material using this composition as in Example I possesses the superior qualities characteristic of the products of the invention. It is found to be somewhat harder than the product of Example I which makes it desirable for applications requiring high pressures. However, other outstanding properties, such as durability, are not adversely affected.

As indicated by the examples, the products of the invention are characterized by curing rapidly to provide gasket material which is non-tacky and cured throughout the body thereof, highly resilient, resistant to solvents, such as petroleum hydrocarbons, and free from porosity. In addition, the gasket material of the invention is resistant to hot water.

A particular feature of the product of the invention is the evenness and completeness of the cure on the application of heat, i. e., the impregnant is subject neither to surface skinning nor to lack of surface cure. By modifications within the limits set forth hereinafter, suitable variation in resiliency may be provided to permit use of the gasket material under either high or low pressure conditions.

Another valuable feature of the products of the invention is their inertness with respect to various materials with which they come in contact, such as magnesium, nickel and iron.

Due to the resiliency of the gasket material of the invention, a certain degree of roughness in the flange surfaces of apparatus sealed therewith is permissible without destroying the effectiveness of the seal.

In addition to other valuable characteristics of the resin compositions of the invention, they have excellent impregnating characteristics, e. g., voids are absent in the gasket material.

Despite the low viscosity and excellent impregnating characteristics of the resin compositions of the invention, no unusual measures need be taken to avoid volatilization during the impregnation of the cellulosic materials and the curing thereof such as enclosure with cellophane or the like. Essentially, the operations consist of thoroughly saturating sheets of the cellulosic material by immersing the same in a bath of the resin composition, e. g., for 1-2 minutes, removing the impregnated sheets and squeezing, for example, between revolving pressure rolls, to remove excess resin and finally curing at an elevated temperature. Usually, it is desirable to carry out these operations continuously, i. e., continuously passing the cellulosic sheets into a resin bath, then between squeeze rolls and finally through an oven.

In contrast to the gasket material of the invention, if drying oil acids are substituted for the semi-drying oil acids in the polyester, the product is too brittle for satisfactory use as a gasket material. In further contrast, the use of non-drying oil acids tends to cause the production of tacky products.

Numerous variations may be introduced into the material used for impregnating the cellulosic sheets. For example, in the preparation of the unsaturated polyester resin the temperature may be substantially varied, as is known to those skilled in the art. However, in order to avoid a reaction of undue length, temperatures of 200° to 250° C. are usually preferred. The reaction is continued until a suitably low acid number is obtained. For most purposes, it is desirable that the polyester resin have an acid number of less than 100.

The relative proportions of the maleic and phthalic anhydrides may be somewhat varied, but it is preferred that the amount of phthalic anhydride constitute 150-225% by weight of the amount of maleic anhydride. A certain amount of variation in the amount of semi-drying oil acids is permissible, i. e., from 100-180% of the amount of maleic anhydride may be made up of such acids. Suitable adjustment in the quantities is made when phthalic acid and/or maleic acid is used in place of the corresponding anhydrides. The amount of glycol is preferably such as to provide sufficient hydroxyl groups to react with all of the carboxyl groups in the reactants or a slight excess (e. g., 5-10% in excess thereof).

In place of ethylene glycol, other glycols having 2 to 4 carbon atoms may be used, as for example, diethylene glycol, 1,2-propanediol and 1,3-propanediol, butylene glycol, etc.

The amount of diallyl phthalate which is admixed with the unsaturated polyester resin may be substantially varied; but in order to provide the superior characteristics of the invention, it is preferred that from 25 to 100 parts of diallyl phthalate be used for every 100 parts of polyester resin.

In general, the impregnating material is so formulated within the limits set forth above as to have a viscosity of 10-50 centipoises at 25° C.

Various metallic driers may be used to ensure thorough curing of the gasket material. Thus, such driers may be used as the naphthenates, resinates and oleates of cobalt, manganese, lead, zinc, or mixtures thereof. A particularly meritorious drier composition is the mixture of cobalt naphthenate and manganese naphthenate used in Example I. Thus, it is found that the use of this mixture leads to faster curing rates than the use of either component alone. The amount of drier may be varied to suit particular requirements, but in general, from 0.001 to 0.1 part are used for every 100 parts of polyester resin, based on the metallic content of the drier.

In place of para-tertiary butyl catechol, other anti-oxidants may be employed, e. g., paraquinone, hydroquinone, o-nitrophenol, etc. The addition of such materials is for the purpose of stabilizing the polymerizable mixtures for storage purposes. In the event that the resinous mixture is to be used immediately, the addition of inhibitors is unnecessary.

In order to provide the impregnant with rapid curing properties, it is desirable to include a peroxide catalyst, such as benzoyl peroxide, acetyl peroxide, etc. For most purposes, 0.5-2 parts of peroxide are used for every 100 parts of polyester.

In place of soybean oil fatty acids, the fatty acids of other semi-drying oils may be used. In general, such oils have an iodine number of 100-150. Examples of other members of this group which may be used include sunflower oil acids, safflower oil acids, sesame oil acids, poppyseed oil acids, corn oil acids, cottonseed oil acids and the like.

Porous cellulosic sheet material, such as uncalendered alpha-cellulose sheets of widely varying thicknessses, may be used in forming the gasket material of the invention. Usually, such material has a thickness of 0.010-0.1 inch, but sheets having other thicknesses may be used, e. g., 0.005-0.5 inch.

It is obvious that many variations may be made in the products and processes of this invention without departing from the spirit and scope thereof as defined in the appended claims.

What is claimed is:

1. Gasket material comprising a cellulosic sheet impregnated with a mixture of 25-100 parts of diallyl phthalate, 100 parts of a polyester made by reacting a mixture of maleic acid, phthalic acid and the acids of a semi-drying glyceride oil with a glycol having 2-4 carbon atoms, an organic peroxide catalyst and a metallic drier, the polyester reaction mixture containing, for every 100 parts of maleic acid calculated as maleic anhydride, 150-225 parts of phthalic acid calculated as phthalic anhydride, 100-180 parts of the fatty acids of the semi-drying oil and sufficient glycol to be stoichiometrically equivalent to the acids present said resin having been cured to an insoluble, infusible state after the impregnation step.

2. A product as defined in claim 1 in which the glycol is ethylene glycol.

3. A product as defined in claim 2 in which the fatty acids are soy bean oil fatty acids.

4. A product as defined in claim 3 in which the metallic drier is a mixture of cobalt naphthenate and manganese naphthenate.

GEORGE L. FRASER.

REFERENCES CITED

The following references are of record in the file of this patent:

UNITED STATES PATENTS

| Number | Name | Date |
|---|---|---|
| 2,340,109 | D'Alelio | Jan. 25, 1944 |
| 2,396,698 | Haines | Mar. 19, 1946 |
| 2,407,479 | D'Alelio | Sept. 10, 1946 |
| 2,443,741 | Kropa | June 22, 1948 |
| 2,457,657 | Glick | Dec. 28, 1948 |
| 2,481,532 | Pockel | Sept. 13, 1949 |